(12) United States Patent
Horsman et al.

(10) Patent No.: US 10,656,812 B2
(45) Date of Patent: May 19, 2020

(54) CONTROLLING AN APPLICATION INSTANCE USING A GRAPHICAL USER INTERFACE

(71) Applicant: International Business Machines Corporation, Armonk, NY (US)

(72) Inventors: Steven J. Horsman, Hampshire (GB); Kathleen Sharp, Berlin (DE); Joseph R. Winchester, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 755 days.

(21) Appl. No.: 14/678,006

(22) Filed: Apr. 3, 2015

(65) Prior Publication Data
US 2015/0293683 A1 Oct. 15, 2015

(30) Foreign Application Priority Data

Apr. 15, 2014 (GB) .................................. 1406750.8

(51) Int. Cl.
*G06F 9/451* (2018.01)
*G06F 3/0484* (2013.01)
*G06F 3/0488* (2013.01)

(52) U.S. Cl.
CPC ........ *G06F 3/04847* (2013.01); *G06F 3/0484* (2013.01); *G06F 3/0488* (2013.01); *G06F 9/451* (2018.02)

(58) Field of Classification Search
CPC .. G06F 3/04847; G06F 3/0484; G06F 3/0488; G06F 9/4443; G06F 3/0481; G06F 9/451
See application file for complete search history.

(56) References Cited

U.S. PATENT DOCUMENTS

| | | | |
|---|---|---|---|
| 7,549,129 B2 | 6/2009 | Sheldon et al. | |
| 7,581,192 B2 | 8/2009 | Stabb et al. | |
| 7,665,031 B2 | 2/2010 | Matthews et al. | |
| 7,673,255 B2 | 3/2010 | Schechter et al. | |
| 8,499,254 B2 | 7/2013 | Sareen et al. | |
| 9,323,423 B1 | 4/2016 | Rosner | |
| 2006/0123353 A1* | 6/2006 | Matthews | G06F 3/0481 715/779 |

(Continued)

OTHER PUBLICATIONS

Application No. 1406750.8, entitled: "Controlling an Application Instance Using a Graphical User Interface", filed on Apr. 15, 2014.

(Continued)

*Primary Examiner* — Mandrita Brahmachari
*Assistant Examiner* — Bille M Dahir
(74) *Attorney, Agent, or Firm* — L. Jeffrey Kelly

(57) ABSTRACT

A method of controlling an application instance using a graphical user interface. In response to the application instance providing a user input control for accepting a command from the user, a corresponding user input control for display in a thumbnail representation of the application instance is generated. When a thumbnail representation of the application instance is displayed, the generated user input control is displayed with the thumbnail representation of the application instance. In response to a user giving a command using the generated user input control, a corresponding command is given to the application instance.

24 Claims, 8 Drawing Sheets

(56) References Cited

U.S. PATENT DOCUMENTS

| | | | |
|---|---|---|---|
| 2006/0242602 A1* | 10/2006 | Schechter | G06F 3/04817 |
| | | | 715/838 |
| 2007/0245250 A1 | 10/2007 | Schechter et al. | |
| 2008/0155455 A1* | 6/2008 | Balasubramanian | |
| | | | G05B 23/0267 |
| | | | 715/779 |
| 2009/0193364 A1 | 7/2009 | Jarrett et al. | |
| 2010/0107123 A1* | 4/2010 | Sareen | G06F 3/0481 |
| | | | 715/835 |
| 2011/0145744 A1* | 6/2011 | Haynes | G06F 3/0481 |
| | | | 715/766 |
| 2011/0314389 A1 | 12/2011 | Meredith et al. | |
| 2012/0072838 A1* | 3/2012 | Ramachandra | G06F 3/0237 |
| | | | 715/271 |
| 2012/0254756 A1* | 10/2012 | Elliott | G06F 9/4443 |
| | | | 715/716 |
| 2017/0322818 A1 | 11/2017 | Saks et al. | |

OTHER PUBLICATIONS

IBM United Kingdom Intellectual Property Office Search Report, Application No. GB1406750.8, dated Oct. 29, 2014.

IBM, "Live Thumbnail View for Direct Viewing/Editing/Manipulating of Several Groups of Objects at Once", An IP.com Prior Art Database Technical Disclosure, Original Publication Date: Jan. 30, 2008, IP.com No. 000167114, IP.com Electronic Publication: Jan. 30, 2008, ip.com.

Softonic, "Safe downloads and expert advice", miniMIZE—Download, http://minimize.en.softonic.com/, Accessed on Jan. 29, 2015, pp. 1-11.

\* cited by examiner

CONTROLLING AN APPLICATION INSTANCE USING A GRAPHICAL USER INTERFACE

BACKGROUND

The present invention relates to controlling application instances using graphical user interfaces. In particular, the invention relates to controlling an application instance using a user input control displayed in a thumbnail representation of the application instance.

Computing devices running modern operating systems usually provide a graphical user interface (GUI) with which a user interacts with the operating system. An example GUI is shown in FIG. 1. The GUI 1 includes a desktop 2. The desktop 2 includes multiple icons 3, which the user can use to open (i.e. run) instances of applications (e.g. word-processing applications, spreadsheet applications and the like). The desktop 2 further includes a "taskbar" 4, which is a portion at the bottom of the desktop comprising multiple icons 5 which correspond to applications with currently open application instances. When an application instance has been minimised (i.e. hidden from the desktop but not closed), or is not visible due to another application instance being in the foreground (i.e. "in front" of it), it can be restored so that is visible to the user by clicking on its icon 5 in the taskbar 4.

As well as allowing instances of different applications to be open at the same time, it is common for GUI operating systems to allow multiple instances of the same application to be open at the same time. It is common for multiple instances of a particular application to share the same icon 5 in taskbar 4. To allow a particular instance of an application to be restored, when the icon 5 for the application (in this case the right-hand icon) is clicked or hovered-over with the mouse pointer, "thumbnails" 6 of the instances of application instances are displayed. The thumbnails 6 are reduced-size versions of the display the application instances would have were they displayed to the user at normal size by the GUI. A particular instance of the application can then be restored by clicking its thumbnail 6.

This system has a number of disadvantages. When closing an application instance, it is often the case that before closing, the application instance will provide a dialog box containing a question the user, for example to allow unsaved changes to a document to be saved, or merely to confirm that the user definitely wishes to close the application. The user then has to restore the instance of the application so that they can answer the dialog box question before the application instance will close. Restoring the application instance to the foreground can be computationally intensive, and can result in a large portion (in some cases all) of the desktop being covered by the application instance merely to allow the dialog box to be shown.

In the case that an application as a whole for which there are multiple open application instances is being closed, or the operating system as a whole is shutting down, the user will have to restore multiple application instances in turn in order to answer the dialog box question for each one. This can be time consuming and can lead to user errors, for example if the user erroneously chooses not to save changes to a document when instances are not restored in the order they are expecting.

In the case that the GUI is displayed upon multiple monitors, a restored application instance may appear on a non-primary monitor, which then requires the user to move their mouse to the relevant monitor answer the dialog box question.

Another disadvantage arises where application instances are multitasked, so that the user has started an application instance on a task (e.g. to copy a number of files to a new location) and then minimised it so that they can interact with other application instances to perform other tasks while the original application instance is working. In this case, the minimised application instance may display a dialog, for example asking for a password, for confirmation on whether to use a potentially insecure connection, whether to skip a task that cannot be performed (e.g. due to a file being locked), or the like. In this case, the minimized application instance is suspended pending a response to the dialog box, and it is advantageous to bring this to the user's attention. Not doing so means that the user has to check the status of the minimised application instance at regular intervals, and when doing so they may find that it has been suspended for a long period pending a dialog box response.

Another disadvantage can arise where an application instance displays a dialog box containing details of a processing error, for example a stack error. In this case, the dialog box may contain details of the error, which can be very long, for example if a dump of stack code is included. In this case, the buttons provided for the user can be off the bottom of the screen, due to the size of the dialog box necessary to contain the error details. In this case, it can be inconvenient or even impossible for the user to respond to the dialog box.

The present invention seeks to solve and/or mitigate some or all of the above-mentioned disadvantages. Alternatively or additionally, the present invention seeks to provide an improved controlling of application instances using a graphical user interface.

SUMMARY

In accordance with a first aspect of the invention there is provided a method of controlling an application instance using a graphical user interface, comprising the steps of:

in response to the application instance providing a user input control for accepting a command from the user, generating a corresponding user input control for display in a thumbnail representation of the application instance;

when displaying a thumbnail representation of the application instance, displaying with the thumbnail representation of the application instance the generated user input control;

in response to a user giving a command using the generated user input control, giving a corresponding command to the application instance.

In this way, the user can respond to a user input control provided by the application instance without having to restore the application instance, by using instead the corresponding user input control displayed in the thumbnail representation of the application instance.

The user input control of the application instance may be provided in a dialog box. The dialog box may be a modal dialog box. In either case, the corresponding user input control may be generated using details obtained using an API provided for interaction with the dialog box.

Advantageously, the corresponding command is provided to the dialog box of the application instance. The corresponding command may be provided using an API provided for interaction with the dialog box.

The user input control of the application instance may be a button.

Advantageously, the method further includes the steps of: determining a displayed text string of the user input control of the application instance; generating the generated user input control using the displayed text string. The user input control may be provided in a dialog box, and the displayed text string of the user input control may be obtained using an API provided for interaction with the dialog box. Preferably, the generated user input control is arranged to display the displayed text string.

Advantageously, the method further includes the steps of: matching a substring of the displayed text string with a predefined text string; obtaining a replacement text string associated with the predefined text string; wherein the generated user input control is arranged to display the replacement text string. The replacement text string may be the empty string. This allows unnecessary text to be identified and omitted.

Advantageously, the method further includes the step of: in response to the application instance providing the user input control, displaying an indicator in an icon for the application instance that the generated user input control is available in the thumbnail representation of the application instance. This provides an indication to the user that the application instance has provided a user input control. The icon may be displayed in a taskbar of the graphical user interface.

In accordance with a second aspect of the invention there is provided a computer system comprising a graphical user interface for controlling an application instance, arranged in response to the application instance providing a user input control for accepting a command from the user, to generate a corresponding user input control for display in a thumbnail representation of the application instance;

wherein the computer system is further arranged to display the generated user input control with the thumbnail representation of the application instance when displaying a thumbnail representation of the application instance using the graphical user interface;

and wherein the computer system is further arranged, in response to a user giving a command using the generated user input control, to give a corresponding command to the application instance.

The user input control of the application instance may be provided in a dialog box. The dialog box may be a modal dialog box.

Advantageously, the computer system is arranged to provide the corresponding command to the dialog box of the application instance.

The user input control of the application instance may be a button.

Advantageously, the computer system is further arranged to determine a displayed text string of the user input control of the application instance, and generate the generated user input control using the displayed text string. Preferably, the generated user input control is arranged to display the displayed text string.

Advantageously, the computer system further includes a store of predefined text strings and associated replacement text strings, wherein the computer system is arranged to match a substring of the displayed text string with a predefined text string in the store, and wherein the generated user input control is arranged to display the replacement text string associated with the predefined text string in the store. The replacement text string may be the empty string.

Advantageously, the computer system is further arranged in response to the application instance providing the user input control, to display an indicator in an icon for the application instance that the generated user input control is available in the thumbnail representation of the application instance. The icon may be displayed in a taskbar of the graphical user interface.

In accordance with a third aspect of the invention there is provided a computer program product for controlling an application instance using a graphical user interface, the computer program product comprising a computer-readable storage medium having computer-readable program code embodied therewith, the computer-readable program code configured to perform any of the methods described above.

In accordance with a fourth aspect of the invention there is provided a computer program product for controlling an application instance using a graphical user interface, the computer program product comprising a computer-readable storage medium having computer-readable program code embodied therewith, the computer-readable program code configured when executed on a computer system to provide any of the computer systems described above.

It will of course be appreciated that features described in relation to one aspect of the present invention may be incorporated into other aspects of the present invention. For example, the method of the invention may incorporate any of the features described with reference to the apparatus of the invention and vice versa.

BRIEF DESCRIPTION OF THE SEVERAL VIEWS OF THE DRAWINGS

Preferred embodiments of the present invention will now be described, by way of example only, with reference to the following drawings in which.

DETAILED DESCRIPTION

Figure 1:
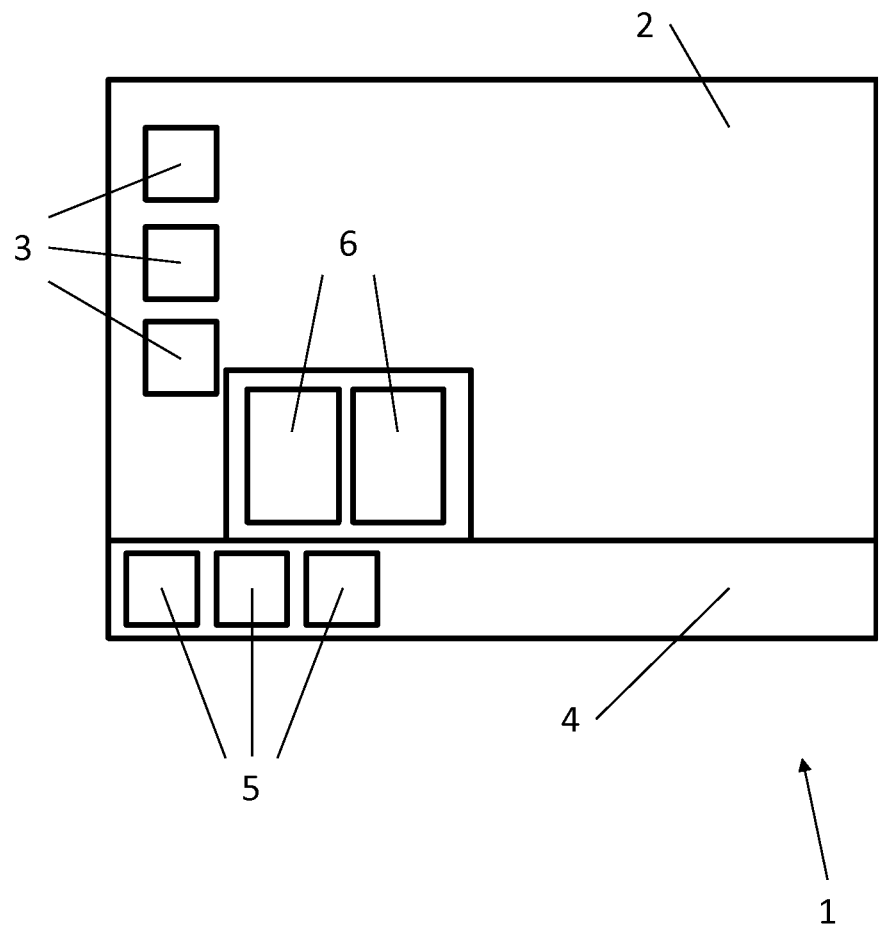
FIG. 1 shows a known graphical user interface.
Figure 2:
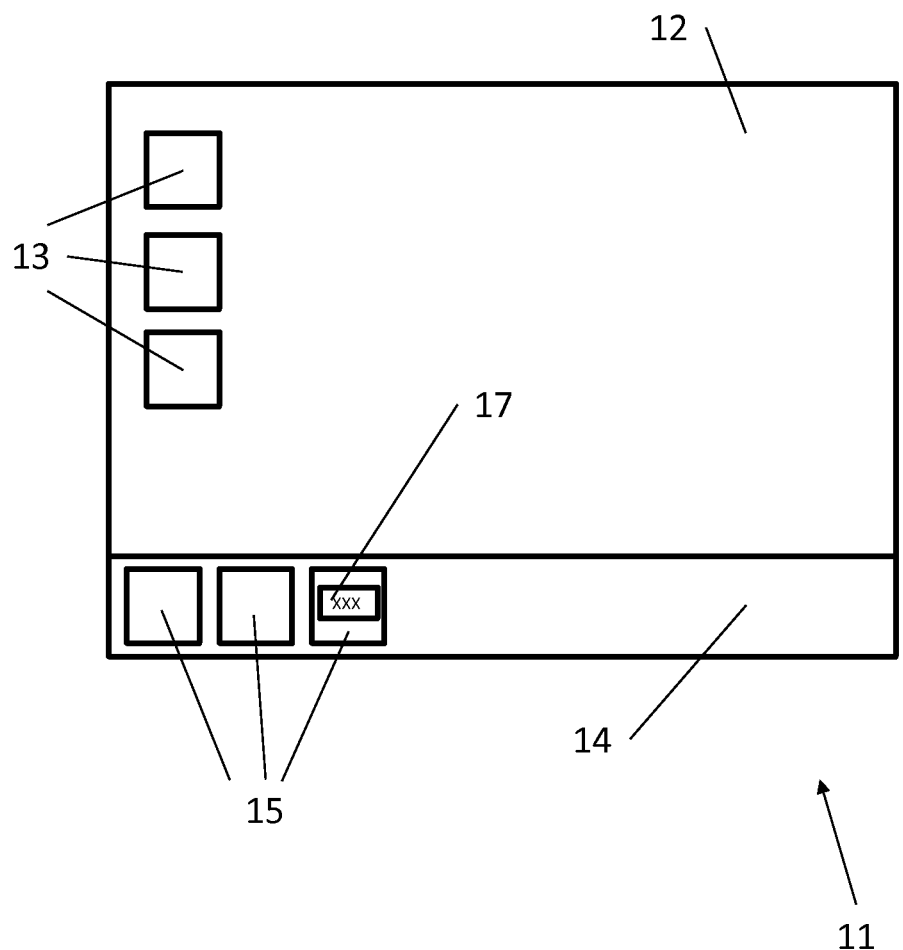
FIG. 2 shows a graphical user interface according to an embodiment of the invention.

A graphical user interface (GUI) of a computing device in accordance with an embodiment of the invention is shown in FIG. 2. As in the known GUI shown in FIG. 1, the GUI 11 includes a desktop 12, which includes multiple icons 13 and a taskbar 14. The taskbar 14 includes multiple icons 15 which correspond to currently open applications.

Figure 3:
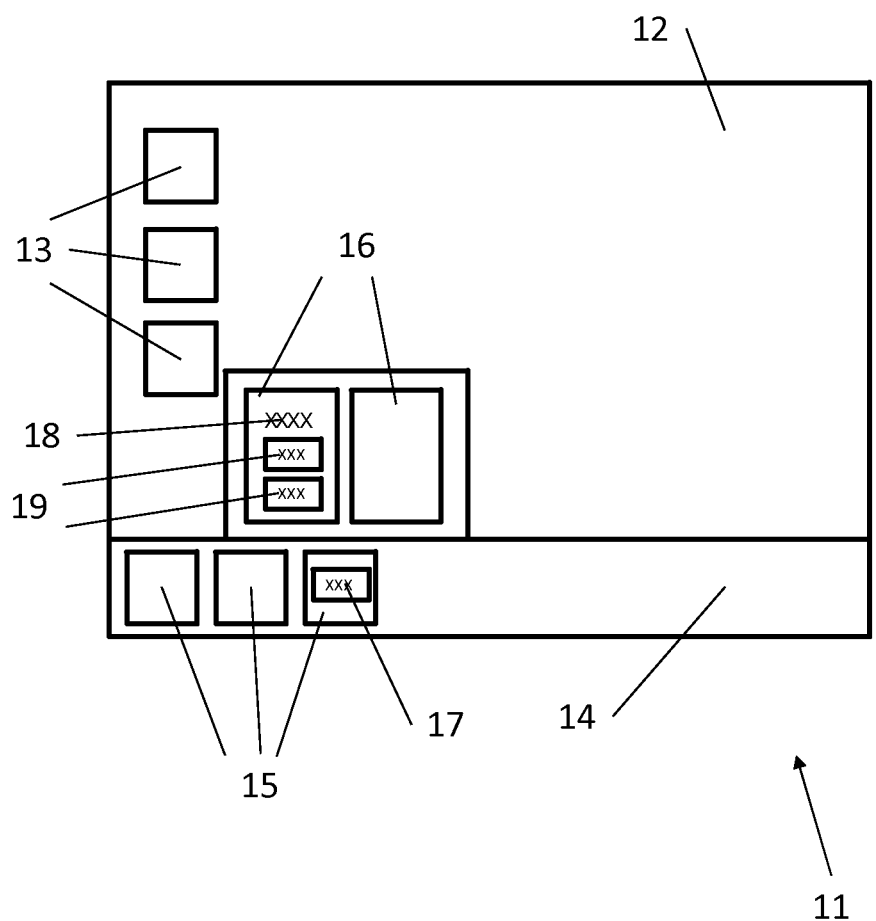
FIG. 3 shows another view of the graphical user interface of FIG. 2.

As can be seen from FIG. 2, the right-hand icon 15 includes an icon indicator 17. This indicates to the user that an application instance to which the icon corresponds has provided a dialog box, which requires an answer from the user. This is described in more detail below. As can further be seen from FIG. 3, when the icon 15 is clicked or hovered-over by the mouse, thumbnails 16 are displayed. As can be seen, the left-hand thumbnail displays a text message 18 and user input controls, in this case buttons 19, again as described in more detail below.

Figure 4:
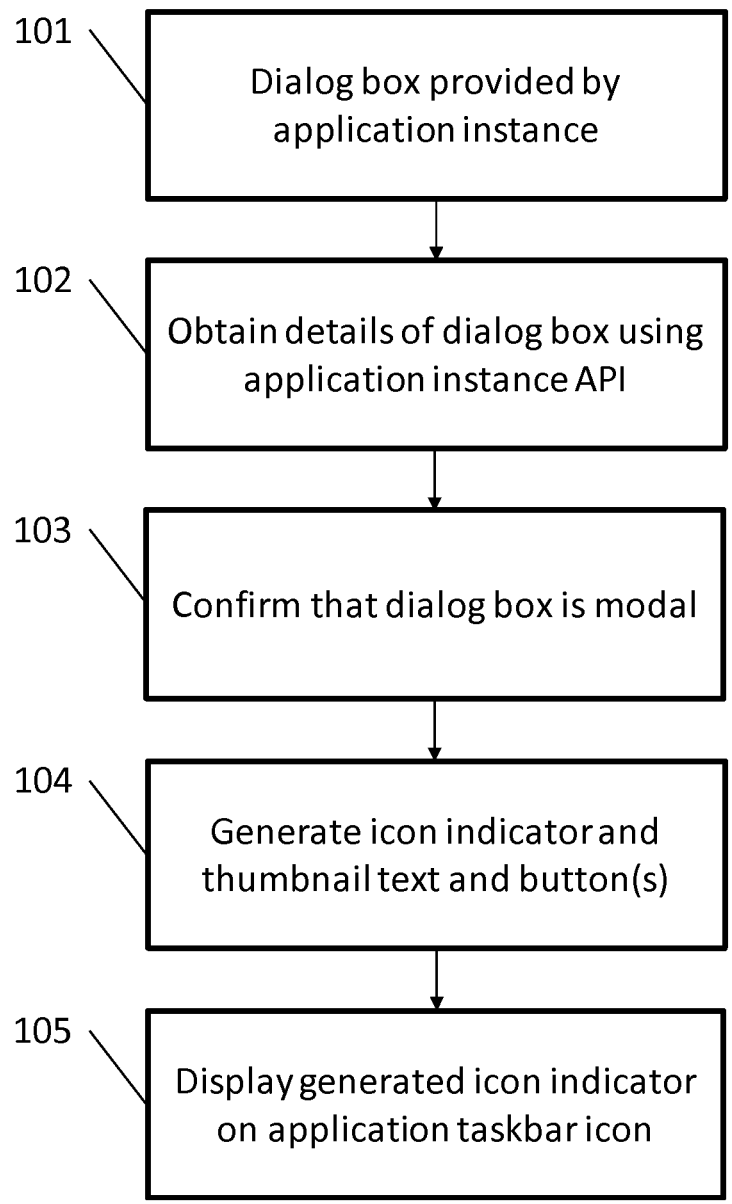
FIG. 4 is a flowchart showing the operation of the graphical user interface when an application instance displays a dialog box.

The operation of the GUI when an application instance provides a dialog box requiring input from the user is now described with reference to the flow chart of FIG. 4. First, the GUI identifies that the application instance has provided a dialog box (step 101). The GUI may do this using an API (application program interface) of the application instance, for example an API used to allow accessibility functionality to be provided such as a "screen reader" API. The GUI obtains the details of the dialog box using the API (step 102). This can generally be done regardless of the type of application instance (i.e. the particular application of which it is an instance), as in most GUIs dialog boxes are created as instantiations of a common set of operating system classes, for example the WM_DIALOG class for Windows operating systems. The components of the dialog box such as buttons and text displayed can then be determined using the API as standard properties of the class.

The GUI then confirms that the dialog box is modal (step 103), i.e. if it is a dialog box that must be responded to and/or dismissed for use of the application instance to continue. Once that has been confirmed, an icon indicator and thumbnail text and buttons are generated (step 104), using the details obtained from the API. In particular, a button is generated corresponding to each button of the dialog box of the application instance, and the icon indicator and thumbnail text are generated using other textual data of the dialog box. The generation of the icon indicator and thumbnail text and buttons is described in more detail below. The generated icon indicator is displayed on the relevant icon 15 (step 105) as the icon indicator 17 discussed above, to indicate to the user that an application instance to which the icon corresponds has provided a dialog box requiring an answer from the user.

Figure 5:
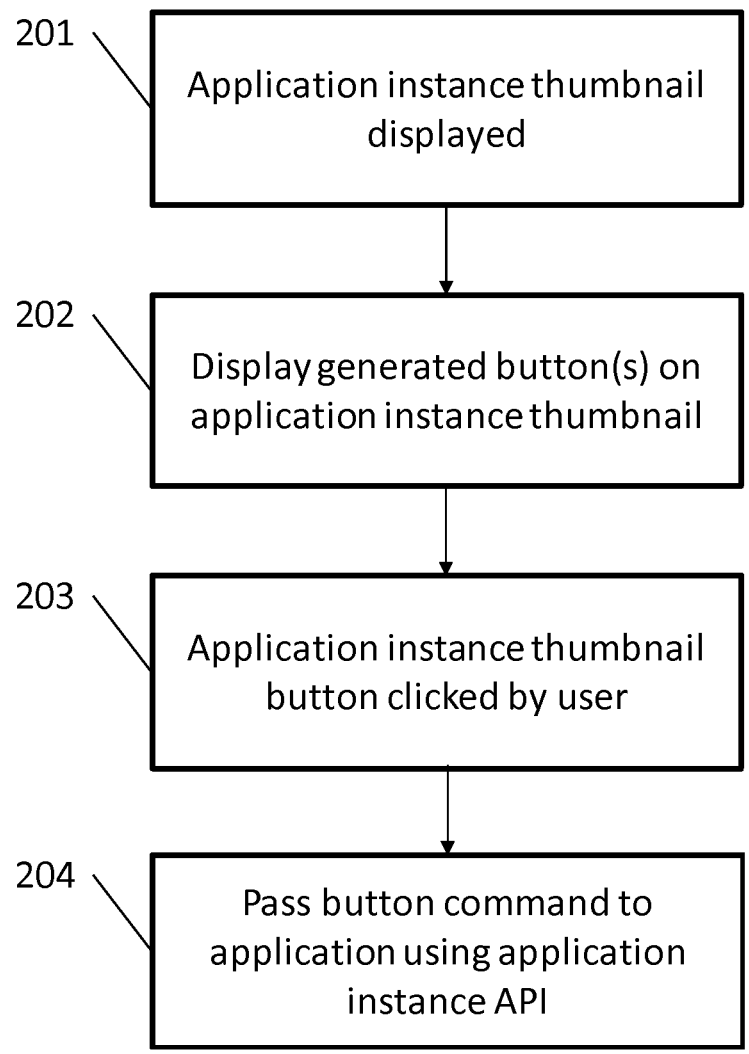
FIG. 5 is a flowchart showing the operation of the graphical user interface when a thumbnail for an application instance is displayed.

The operation of the GUI when the thumbnails for an application instance are displayed is now described with reference to the flow chart of FIG. 5. First, the GUI displays the application instance thumbnail in the conventional manner (step 201), for example in response to the relevant application taskbar icon being clicked or hovered over. However, in addition the GUI displays on the thumbnail the generated text and buttons (step 202), as generated in step 104 of FIG. 3, as the text message 18 and buttons 19 discussed above.

The user may click a button 19 of the thumbnail 15 (step 203), for example because they wish to save any changes in a document or wish the application instance to continue processing. The GUI then passes the command associated with the button to the application instance, using the application instance API (step 204).

Figure 6:
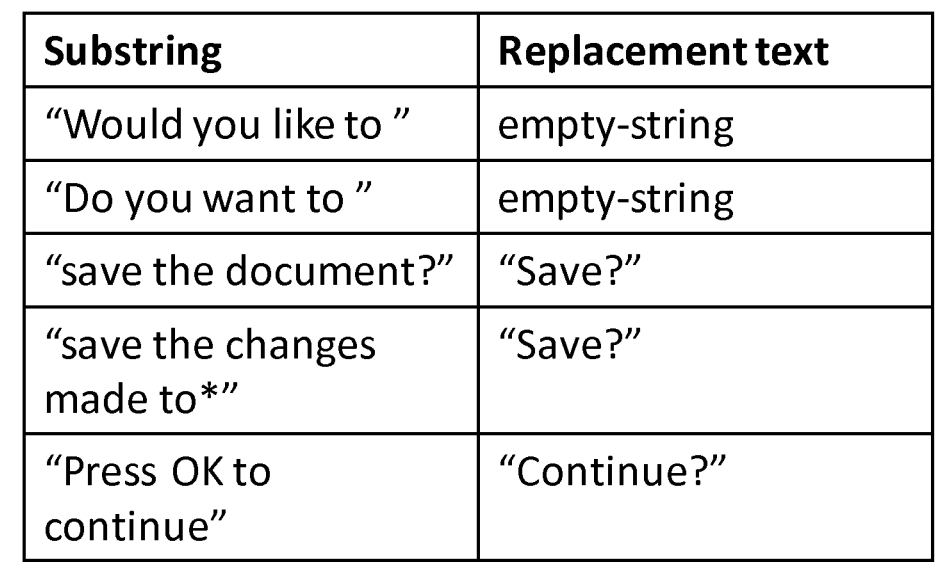
FIG. 6 shows a store of dialog box substring and replacement strings.

The generation of icon identifiers and thumbnail message texts and buttons is now described. FIG. 6 shows a store 50 of substrings and replacement texts, as stored in the memory of the computing device running the GUI. As can be seen, the memory stores substrings "Would you like to" and "Do you want to" each with the empty string as replacement text; substrings "save the document?" and "save the changes made to*" (where * is a "wildcard" representing any following text) are stored with replacement string "Save?"; and the substring "Press OK to continue" is stored with replacement string "Continue".

Figure 7:
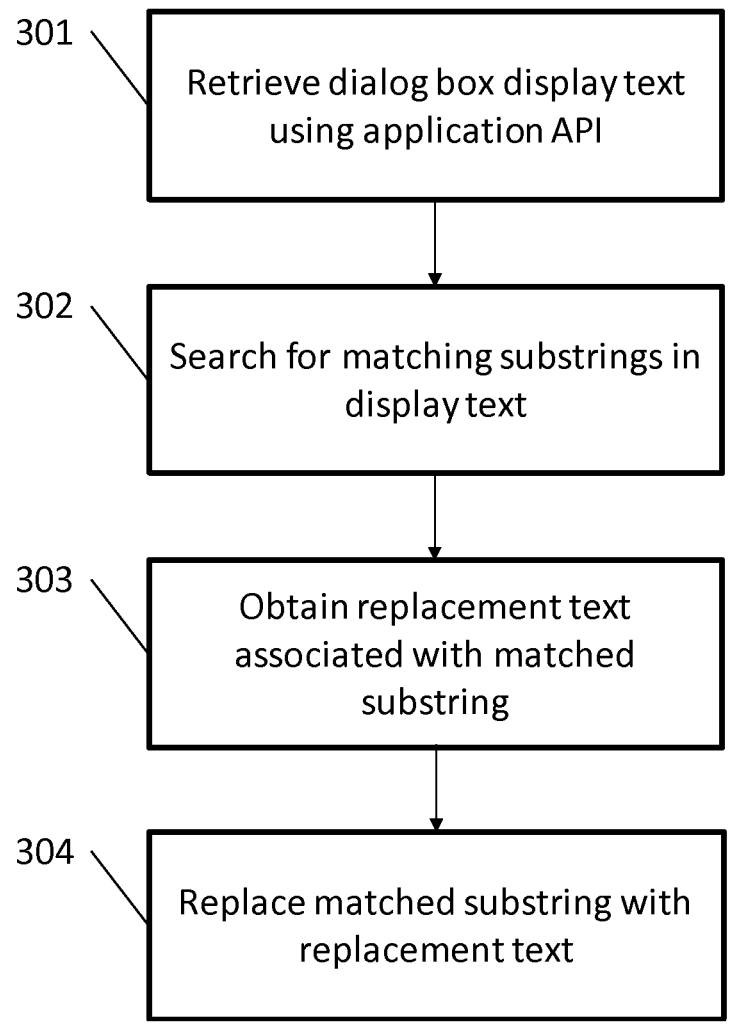
FIG. 7 is a flowchart showing the operation of the graphical user interface when generating the text for icon indicator and thumbnail message text and buttons.

The operation of the GUI when generating the text for icon indicator and thumbnail message text and buttons is now described with reference to the flow chart of FIG. 7. First, a relevant display text of the dialog box is retrieved using the application instance API (step 301). This may be, for example, the title text of the dialog box for the icon indicator 17, text displayed in the dialog box for the thumbnail message text 18, and dialog box button text for the buttons 19, for example. The graphical user interface then searches the retrieved text for substrings that match those stored in the store 50 (step 302). If a matching substring is found, the associated replacement text stored in the store 50 is obtained (step 303), and the substring is replaced with the replacement text (step 304).

Thus, suppose the title of the dialog box is "Would you like to save the changes made to document1?". The substring ""Would you like to" will be matched and replaced with the empty string, while the substring "save the changes made to document1?" will be matched with ""save the changes made to*" (because of the wildcard) and replaced with "Save?". Thus, the text determined for the icon indicator from the title of the dialog box will be the text "Save?".

It will be appreciated that alternative logic for determining the text for the icon indicator and thumbnail message text and buttons could be used. For example, the icon indicator could always simply display an exclamation mark to merely indicate that a user response is required.

Thus it can be seen that the embodiment provides an indication to a user via the icon indicator that an application instance has provided a dialog box that requires a response. If desired, the content of the dialog box can be used to determine an appropriate text to display in the indicator to indicate to the user the type of response required. Further, the thumbnails provide further message text and buttons that allow the user to provide their desired response directly to the thumbnail without the application instance having to be restored, as the command is passed by the thumbnail to the dialog box. Again, the content of the dialog box can be used to determine appropriate texts to display to the user in the thumbnail and in the buttons of the thumbnail.

It will be appreciated that user input controls other than buttons could be used, for example text input controls to allow the user to enter a password, filename or the like, or any other appropriate input control with which the user can interact. It will further be appreciated that corresponding icon notifications and thumbnail text and buttons (or other corresponding user input controls) could be generated for displays provided by application instances other than dialog boxes.

Figure 8:
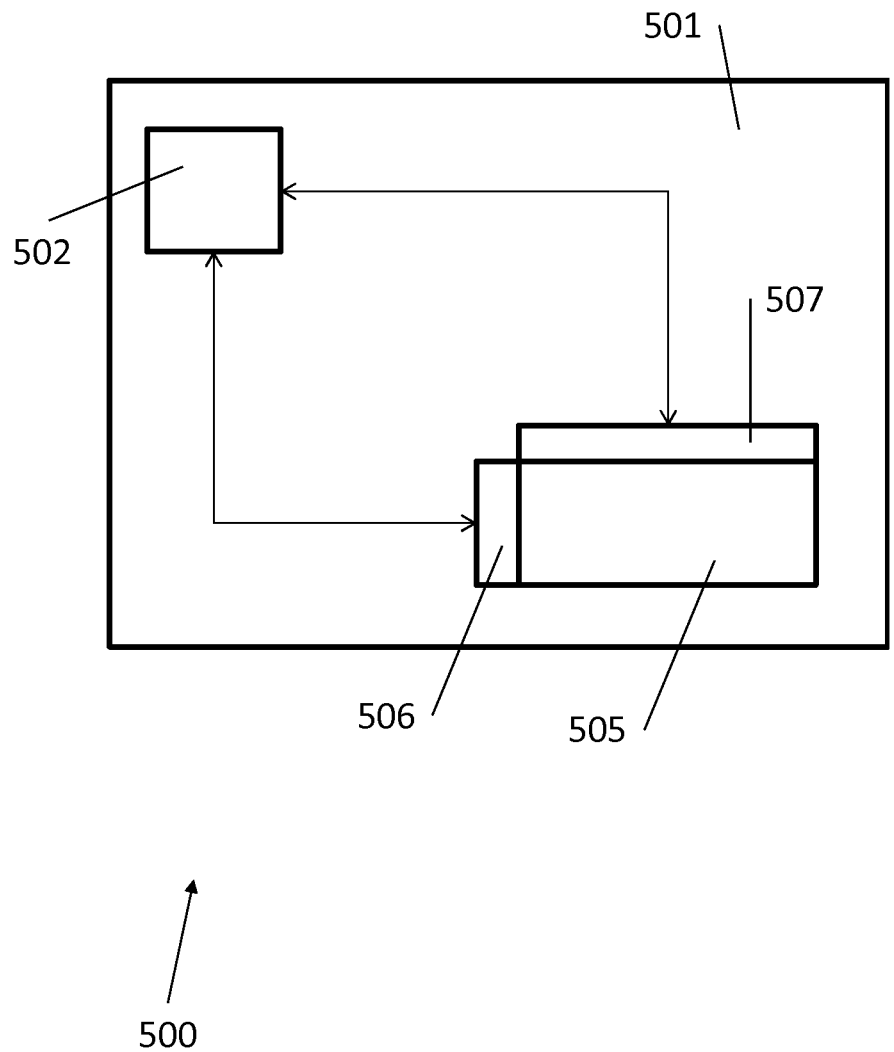
FIG. 8 is a schematic diagram showing the components of a computer system of an embodiment of the invention.

FIG. 8 is a schematic diagram showing the components of a computer system of an embodiment of the invention. The computer system 500 includes an operating system 501, which generally controls and manages the operation of the computer system, in particular the GUI displayed to the user. The operating system 501 includes a taskbar service 502, which provides the taskbar displayed to the user as part of the GUI.

The operating system 501 further includes an application instance 505. The application instance 505 includes a first API 506, which as can be seen from FIG. 8 is in communication with the taskbar service 502. The first API 506 is used by the taskbar service 502 to provide the information it requires to display the application instance 505 in the taskbar in the conventional manner, for example to provide details of the application instance 506 to allow its corresponding icon to be displayed on the taskbar, and an indication of the display provided by the application instance 505 to allow its corresponding thumbnail to be displayed.

The application instance 505 further includes a second API 507, which as can be seen from FIG. 8 is also in communication with the taskbar service 502. The second API 507 conventionally provides the information required for accessibility functionality, such as a screen reader. In this case, the second API 507 is used by the taskbar service 502 to provide the information it requires to generate and display the icon indicator on the icon for the application instance 505 on the taskbar, and the thumbnail text and buttons on the thumbnail for the application instance 505, as described in more detail above.

Whilst the present invention has been described and illustrated with reference to particular embodiments, it will be appreciated by those of ordinary skill in the art that the invention lends itself to many different variations not specifically illustrated herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or control code written in any combination of one or more programming languages, including an control oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of controlling an application instance using a graphical user interface, the method comprising:
generating a user input control for display in a thumbnail representation of the application instance in response to the application instance providing a modal dialog box for accepting a command from a user, wherein the generated user input control comprises a button corresponding to each button of the model dialog box;
displaying the thumbnail representation of the application instance via the graphical user interface in response to the user interacting with a taskbar icon corresponding to the application instance;
displaying the generated user input control within the thumbnail representation of the application instance in response to displaying the thumbnail representation of the application instance; and
giving a corresponding command to the application instance in response to the user giving the command using the generated user input control.

2. The method of claim 1, wherein the corresponding command is provided to the modal dialog box of the application instance.

3. The method of claim 1, further comprising:
determining a displayed text string of the modal dialog box; and
generating the user input control based on the displayed text string.

4. The method of claim 3, further comprising:
matching a substring of the displayed text string with a predefined text string; and
obtaining a replacement text string associated with the predefined text string,
wherein the generated user input control is arranged to display the replacement text string.

5. The method of claim 1, further comprising:
displaying an indicator in the taskbar icon corresponding to the application instance, wherein the indicator is based on textual data of the modal dialog box and indicates to the user that the generated user input control is available in the thumbnail representation of the application instance and requires input from the user.

6. The method of claim 1, further comprising:
displaying thumbnail text within the thumbnail representation of the application instance in response to displaying the thumbnail representation of the application instance, the thumbnail text being based on textual data of the modal dialog box.

7. The method of claim 1, wherein the user input control comprises a text input control for inputting text.

8. The method of claim 1, wherein the user interacting with the taskbar icon corresponding to the application instance comprises the user clicking or hovering over the taskbar icon.

9. A method of controlling an application instance using a graphical user interface, the method comprising:
generating a user input control for display in a thumbnail representation of the application instance in response to the application instance providing a modal dialog box requiring a command from a user for use of the application instance to continue, wherein the generated user input control comprises a button corresponding to each button of the model dialog box;
displaying the thumbnail representation of the application instance via the graphical user interface in response to the user interacting with a taskbar icon corresponding to the application instance;
displaying the generated user input control within the thumbnail representation of the application instance in response to displaying the thumbnail representation of the application instance;
receiving the command from the user via the generated user input control within the thumbnail representation of the application instance; and
giving a corresponding command to the application instance in response to receiving the command from the user via the generated user input control within the thumbnail representation of the application instance.

10. The method of claim 9, wherein the corresponding command is provided to the modal dialog box of the application instance.

11. The method of claim 9, further comprising:
determining a displayed text string of the modal dialog box; and
generating the user input control based on the displayed text string.

12. The method of claim 11, further comprising:
matching a substring of the displayed text string with a predefined text string; and
obtaining a replacement text string associated with the predefined text string,
wherein the generated user input control is arranged to display the replacement text string.

13. The method of claim 9, further comprising:
displaying an indicator in the taskbar icon corresponding to the application instance, wherein the indicator is based on textual data of the modal dialog box and indicates to the user that the generated user input control is available in the thumbnail representation of the application instance and requires input from the user.

14. The method of claim 9, further comprising:
displaying thumbnail text within the thumbnail representation of the application instance in response to displaying the thumbnail representation of the application instance, the thumbnail text being based on textual data of the modal dialog box.

15. The method of claim 9, wherein the user input control comprises a text input control for inputting text.

16. The method of claim 9, wherein the user interacting with the taskbar icon corresponding to the application instance comprises the user clicking or hovering over the taskbar icon.

17. A method of controlling an application instance using a graphical user interface, the method comprising:
generating a user input control for display in a thumbnail representation of the application instance in response to the application instance providing a dialog box for accepting a command from a user required for use of the application instance to continue, wherein the generated user input control comprises a button corresponding to each button of the dialog box;

generating an icon indicator for display in a taskbar icon corresponding to the application instance in response to the application instance providing the dialog box for accepting a command from the user required for use of the application instance to continue, the icon indicator being based on textual data of the dialog box and indicating to the user that the application instance provided a dialog box requiring the user's attention;

displaying the thumbnail representation of the application instance with the user input control via the graphical user interface in response to the user interacting with the taskbar icon corresponding to the application instance;

receiving the command from the user via the generated user input control within the thumbnail representation of the application instance; and giving a corresponding command to the application instance in response to receiving the command from the user via the generated user input control within the thumbnail representation of the application instance.

18. The method of claim 17, wherein the corresponding command is provided to the modal dialog box of the application instance.

19. The method of claim 17, further comprising:
determining a displayed text string of the modal dialog box; and
generating the user input control based on the displayed text string.

20. The method of claim 19, further comprising:
matching a substring of the displayed text string with a predefined text string; and
obtaining a replacement text string associated with the predefined text string,
wherein the generated user input control is arranged to display the replacement text string.

21. The method of claim 17, further comprising:
displaying an indicator in the taskbar icon corresponding to the application instance, wherein the indicator is based on textual data of the modal dialog box and indicates to the user that the generated user input control is available in the thumbnail representation of the application instance and requires input from the user.

22. The method of claim 17, further comprising:
displaying thumbnail text within the thumbnail representation of the application instance in response to displaying the thumbnail representation of the application instance, the thumbnail text being based on textual data of the modal dialog box.

23. The method of claim 17, wherein the user input control comprises a text input control for inputting text.

24. The method of claim 17, wherein the user interacting with the taskbar icon corresponding to the application instance comprises the user clicking or hovering over the taskbar icon.

* * * * *